United States Patent
Piou

(10) Patent No.: US 7,124,835 B2
(45) Date of Patent: Oct. 24, 2006

(54) AGRICULTURAL MACHINE COMPRISING A TOWED SUPPORT FRAME AND ROLLERS PROVIDED WITH A SET OF DOME PROFILE PNEUMATIC TIRES

(75) Inventor: Denis Piou, Villeblevin (FR)

(73) Assignee: Otico, Longueville (FR)

( * ) Notice: Subject to any disclaimer, the term of this patent is extended or adjusted under 35 U.S.C. 154(b) by 0 days.

(21) Appl. No.: 10/969,059

(22) Filed: Oct. 21, 2004

(65) Prior Publication Data

US 2005/0087351 A1    Apr. 28, 2005

(30) Foreign Application Priority Data

Oct. 27, 2003   (FR)   .................................. 03 12539

(51) Int. Cl.
*A01B 35/28* (2006.01)

(52) U.S. Cl. ....................................... 172/539; 172/519

(58) Field of Classification Search ................ 172/518, 172/519, 539, 600, 599, 551, 170, 150; 404/127, 404/132
See application file for complete search history.

(56) References Cited

U.S. PATENT DOCUMENTS

| | | | | |
|---|---|---|---|---|
| 85,641 A | * | 1/1869 | Capran | 404/126 |
| 201,368 A | * | 3/1878 | Ufford | 404/125 |
| 247,698 A | * | 9/1881 | Sherwin | 404/126 |
| 634,737 A | * | 10/1899 | Newman | 404/126 |
| 649,423 A | * | 5/1900 | Hinman | 404/122 |
| 681,297 A | * | 8/1901 | Bruckman | 404/126 |
| 694,213 A | * | 2/1902 | Stark | 404/125 |
| 976,293 A | * | 11/1910 | Reiff | 404/122 |
| 1,293,600 A | * | 2/1919 | Winegarner | 404/125 |
| 1,607,672 A | * | 11/1926 | Gray | 404/122 |
| 1,842,717 A | * | 1/1932 | Doyle | 404/132 |
| 1,843,110 A | * | 2/1932 | Cooper | 172/539 |
| 2,587,463 A | * | 2/1952 | Guignard | 404/125 |
| 2,640,405 A | * | 6/1953 | Wheeler | 172/449 |
| 2,798,419 A | * | 7/1957 | Moriceau | 172/572 |
| 4,043,400 A | * | 8/1977 | van der Lely et al. | 172/43 |
| 4,163,329 A | * | 8/1979 | Neff | 37/222 |
| 4,168,750 A | * | 9/1979 | Combs | 172/311 |
| 4,662,779 A | * | 5/1987 | Kaltenegger | 404/125 |
| 6,119,788 A | * | 9/2000 | Bernier | 172/311 |
| 6,793,437 B1 | * | 9/2004 | Kitko et al. | 404/126 |

FOREIGN PATENT DOCUMENTS

| | | |
|---|---|---|
| DE | 1995748 U | 10/1968 |
| DE | 3605975 | 8/1987 |
| DE | 3634175 | 4/1988 |
| DE | 3734521 | 6/1989 |
| FR | 2489649 | 3/1982 |
| FR | 2799692 | 4/2001 |

\* cited by examiner

*Primary Examiner*—Victor Batson
(74) *Attorney, Agent, or Firm*—Dennison, Schultz & MacDonald

(57) ABSTRACT

The machine comprises a given number of roller pairs respectively connected to the machine frame by a linking part (32). The linking part (32) of each roller pair is adapted so as to enable the rollers (12a, 12b) to incline freely about a first roll axis (YY') perpendicular to and coplanar with the longitudinal axis (XX') of the rollers and about a second axis (HH') parallel to the pitch axis of the frame (10), no matter what deformations of the road or terrain are encountered. Application in particular to seed drills for agricultural machines.

12 Claims, 3 Drawing Sheets

Figure 5:
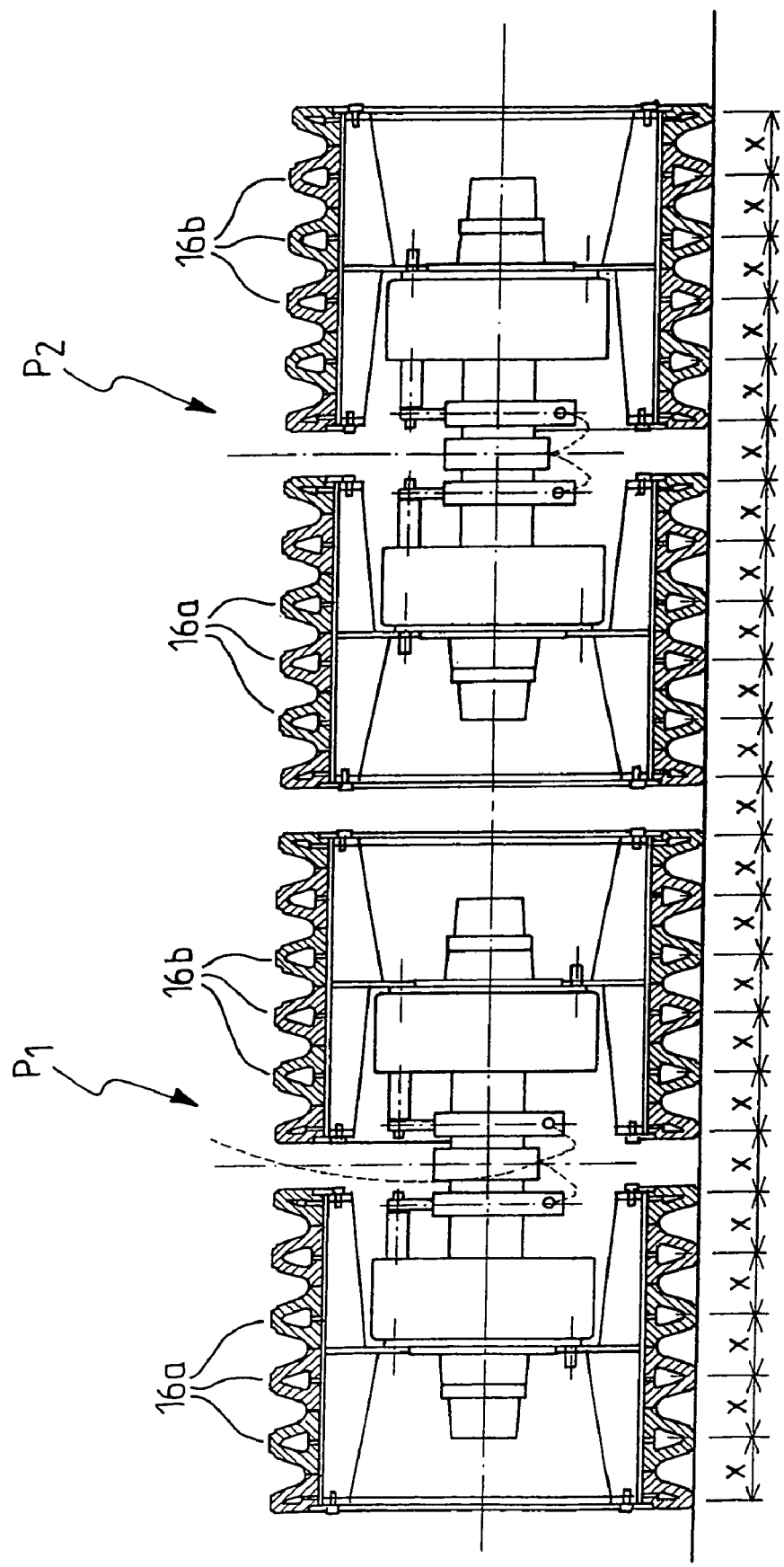

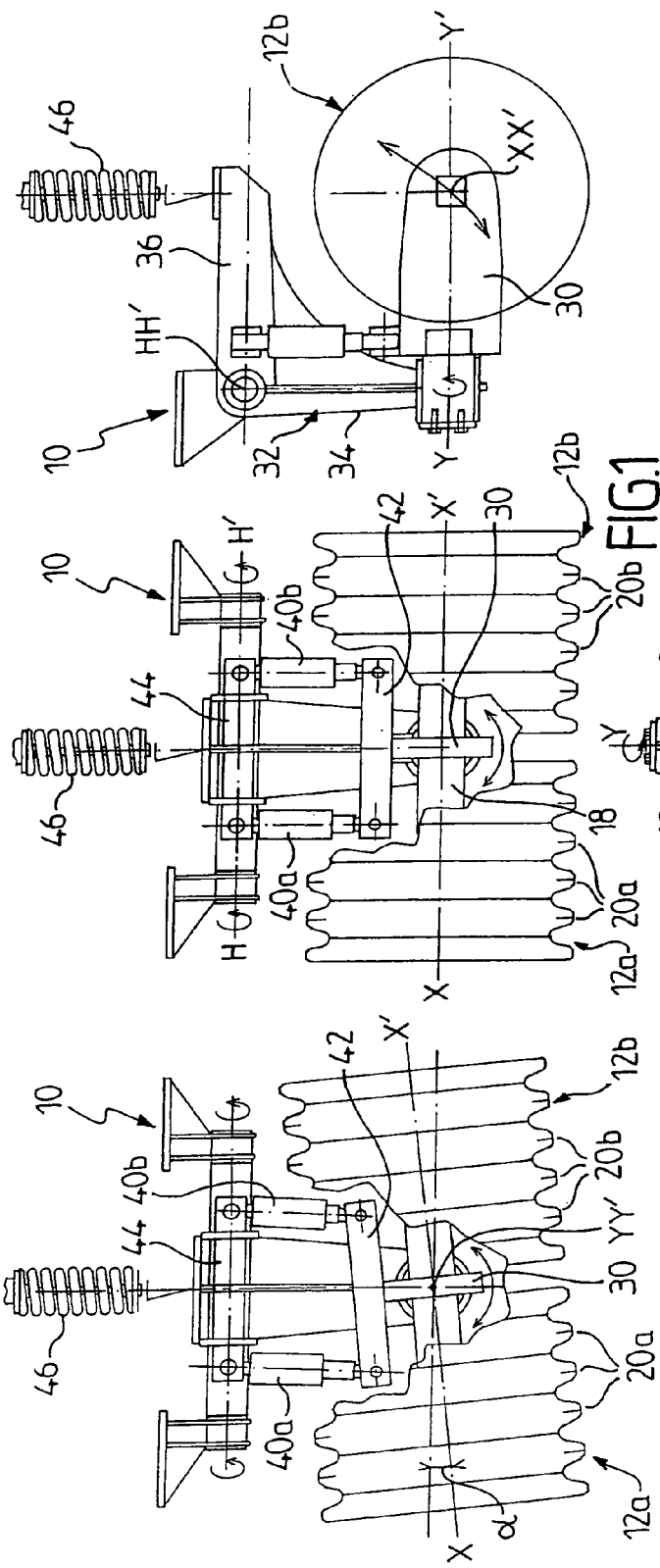
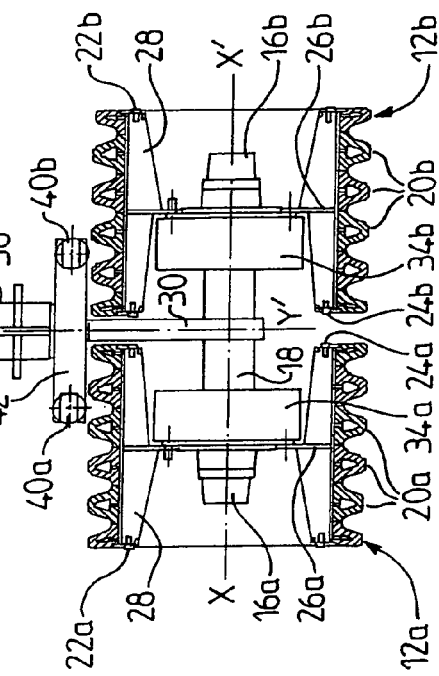

AGRICULTURAL MACHINE COMPRISING A TOWED SUPPORT FRAME AND ROLLERS PROVIDED WITH A SET OF DOME PROFILE PNEUMATIC TIRES

The invention relates to an agricultural machine of the type comprising one or more rollers, each equipped with a set of pneumatic tyres engaged on a horizontal tube, said tyres having a dome profile making it possible to create in the soil furrows in order to sow seed therein or transplant plants.

A roller of this type is known, e.g. from FR-A-2 763 779 in the name of the present applicant and which describes in detail pneumatic tyres usable for this purpose. These tyres are of the uninflated, semi-hollow type with a cross-section such that the tread part having a dome profile does not subside excessively or collapse under the load, whilst still having an adequate flexibility to enable it to undergo deformations.

This type of agricultural roller is more particularly usable with a seed drill in order to form in the soil furrows for receiving seed. These rollers can also be used for bearing on the soil again following seeding. They can be used alone or in combination, not only with a drill, but also with other tools, e.g. for soil preparation purposes.

Hitherto such rollers have been designed solely to work in the field. For the movement of the machine on the road, the roller must be carried in such away that its tyres do not run on the road, which would cause rapid wear. To this end the roller or the machine incorporating the same is equipped with carrying wheels retractable between a working position where the roller rests freely on the ground and a road position where the roller is supported above ground level.

The invention more particularly aims at proposing a semi-carried agricultural machine having several rollers equipped with their pneumatic tyres and able to work in the field for forming furrows in the soil and run on the road without it being necessary to raise the same, thereby economizing on the retractable carrying wheels or similar systems, together with the control means for such carrying wheels (actuator, bolt, etc.).

It also aims at proposing a machine of this type ensuring a spacing substantially between the domes of the pneumatic tyres of a roller and also in the gap separating two aligned rollers.

For this purpose the invention proposes an agricultural machine of the type described in FR-A-2 763 279, i.e. having rollers and a towed support frame, each roller having at least one tube fitted to rotate about a horizontal axis on bearings or hubs connected to the support frame, said tube being provided with a set of pneumatic tyres engaged on said tube and having circumferential, dome-shaped profiles able to form a set of parallel furrows in the ground.

According to the invention, the machine comprises a given number of pairs of rollers respectively connected to the support frame of the machine by a linking or joining part. The linking or joining part of each pair of rollers is adapted so as to enable the rollers to incline freely about a first roll axis YY' perpendicular to and coplanar with the longitudinal axis XX' of the rollers and about a second axis HH' parallel to the pitch axis of the frame, no matter what deformations are encountered in the road or terrain.

In an advantageous embodiment, each roller comprises a central tube mounted on a hub at the end of an axle having a longitudinal axis XX' and about which are engaged a set of identical pneumatic tyres and the axle is rendered integral with the support frame by means of a towing leg fixed by one of its ends to the centre of the axle and engaged by its other end in a thrust bearing of the linking part.

The linking part of each pair of rollers is preferably shaped like a gallows having an upright and a crossbar positioned at right angles and is articulated at the intersection of the upright and the crossbar about an articulation axis HH' parallel to the pitch axis of the frame and the towing leg is articulated by its end engaged in the thrust bearing of the linking part about a roll axis YY' perpendicular to and coplanar with the axis XX' of the axle.

Preferably the thrust bearing is fixed to the gallows upright at its end opposite to that common with the crossbar.

The towing leg of each pair of rollers is rotated about the roll axis YY' by two jacks arranged symmetrically respectively bearing at the ends of a supporting bar fixed in its centre to the end opposite to that which is fixed to the axle and oriented in a direction parallel to that of the axle axis XX' and the opposite ends of the jacks to those bearing on the supporting bar are fixed to a second supporting bar integral with the first and second parallel branches and oriented in a direction parallel to the second articulation axis HH'.

Advantageously a shock absorber is interposed between the free end of the crossbar and the frame in order to cushion movements of the linking part about the second articulation axis HH'.

In order to satisfy road traffic legislation, the hubs are equipped with drum or disk brakes.

The pneumatic tyres are preferably maintained between two end flanges ensuring the holding and securing of the set of tyres. The flanges can be dismantled so as to be able to fit or replace the tyres. A transverse disk is fixed perpendicular to the inner wall of each of the tubes by brackets in order to ensure the fixing of each tube respectively on two hubs fixed to the axle ends.

An embodiment is described hereinafter relative to the attached drawings, which show:

FIG. 1 A front view, part broken away, of a first embodiment of an assembly device for a pair of rollers according to the invention.

FIG. 2 A cross-sectional view of the assembly device of FIG. 1.

FIG. 3 A part sectional view of the device of FIG. 1 from above.

FIG. 4 A view identical to FIG. 1 in which the pair of rollers is in an inclined position relative to the horizontal plane of the chassis.

FIG. 5 A view showing an assembly method for the two roller pairs according to the invention.

Figure 6:
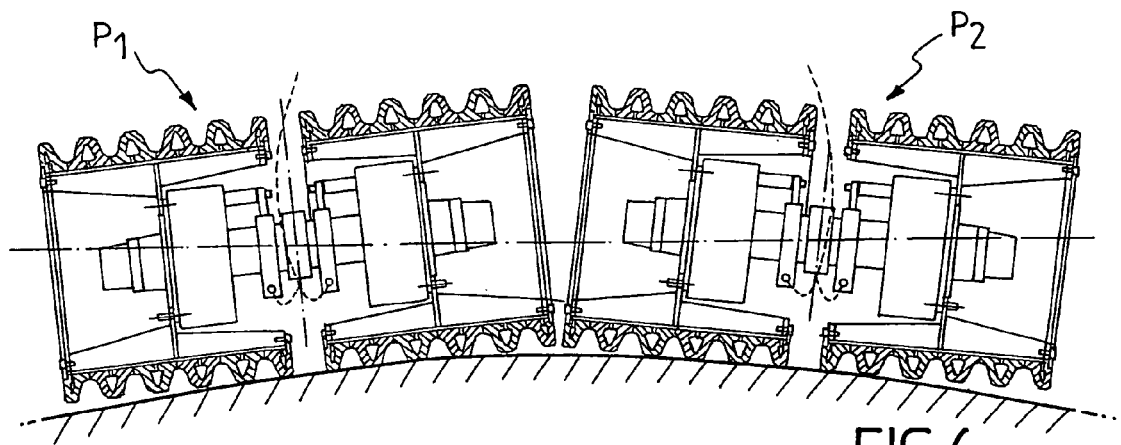
Figure 7:
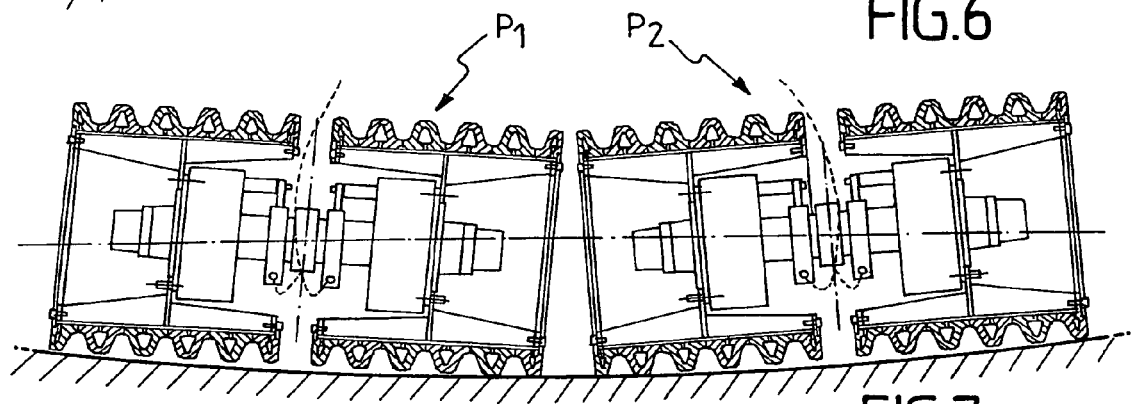
Figure 8:
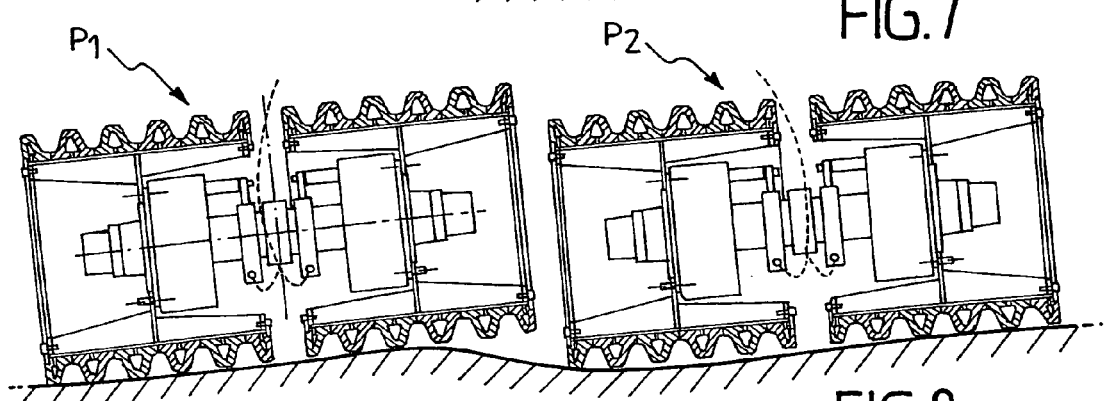

FIGS. 6, 7 & 8 Different attitudes assumed by the rollers in the assembly method of FIG. 5 for different or road geometries.

Figure 9:
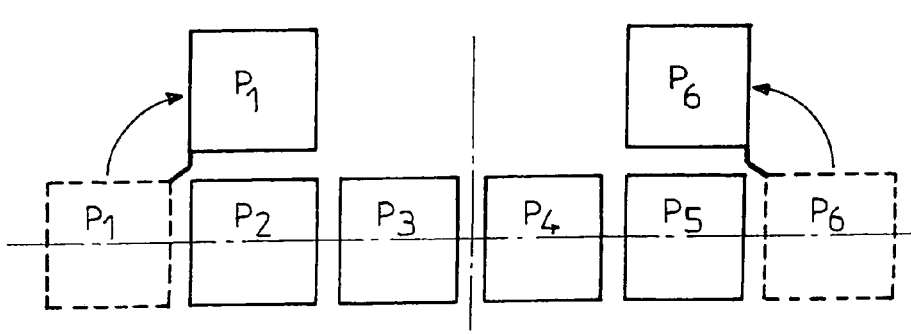

FIG. 9 A block diagram of an agricultural machine according to the invention incorporating a device for folding back pairs of rollers for transportation on the road.

Reference should firstly be made to FIGS. 1, 2 and 3 showing an agricultural machine frame 10 on which are mounted two rollers 12a and 12b, e.g. rollers for a seed drill and of longitudinal axis XX'. Each roller comprises a central tube respectively 14a, 14b, fitted to a hub 16a, 16b at the end of an axle 18. A set of identical pneumatic tyres 20a, 20b is engaged around each central tube. The tyres 20a, 20b have a circumferential, dome-shaped profile enabling the rollers to form furrows on the surface of the ground and they are stacked so as to touch one another and are held between two end flanges 22a, 24a and 22b, 24b ensuring the holding and securing of the set of tyres (FIG. 3).

Flanges 22a, 24a and 22b, 24b can be dismantled so as to be able to fit or replace the tyres. They can also be equipped with lugs (not shown), which can engage in appropriate recesses of the end tyres in order to stop the rotation of the latter with respect to the tubes 14a, 14b.

A transverse disk 26a, 26b is fixed perpendicular to the inner wall of each of the tubes 14a, 14b in order to ensure the fixing of each tube 14a, 14b to respectively the two hubs 16a, 16b fitted to the ends of the axle 18.

In order to ensure a good fixing rigidity of each of the tubes 14a, 14b on its hub 16a, 16b, radial brackets 28 are placed on either side of each of the disks 26a, 26b and are fixed by any known means between the surfaces of each of the disks 26a, 26b and the inner walls of the tubes 14a, 14b.

The axle 18 is rendered integral with the support frame by means of a towing leg 30 fixed by one of its ends to the centre of the axle 18 and a linking or joining part 32.

As a result of the reaction of the tyres 20a, 20b on the ground, the displacement of the support frame 10 brings about the rotation of the rollers 12a, 12b in such a way that, as a result of their dome profile, the tyres create parallel furrows in the ground and in which can e.g. be sown seed.

According to the invention, the machine described hereinbefore is adapted so as not only to be able to work in the field, but also run on the road, the pneumatic tyres remaining in contact with the road.

For this purpose the hubs 16a, 16b are equipped with disk or drum brakes 34a, 34b and the linking part 32 is such that it enables the rollers 12a, 12b to incline freely by an angle of plus or minus α (FIG. 4) about a first articulation axis YY' perpendicular to the longitudinal axis of the rollers 12a, 12b and about a second articulation axis HH' having a direction parallel to the pitch axis of the frame and perpendicular to that of the first articulation axis YY', so as to enable the rollers 12a, 12b to remain in contact with the ground no matter what the deformations of the road or the land which is to be sown.

For this purpose the linking part 32 is shaped like a gallows and has a vertical upright 34 and a crossbar 36 arranged at right angles. The linking part 32 is articulated at the intersection of the upright 34 and crossbar 36 about the second articulation axis HH' parallel to the pitch axis of the frame 10.

The towing leg is fixed by one of its ends to the centre of the axle 18 and is engaged by its other end in a thrust bearing 38 of the linking part 32 located at the end of the upright 34 opposite to that common to the upright 34 and the crossbar 36 enabling it to rotate about the first articulation axis YY'.

The towing leg 30 is rotated about the first articulation axis YY' under the thrust of two pneumatic or hydraulic, single or double action jacks 40a, 40b arranged symmetrically and bearing respectively at the ends of a supporting bar 42 fixed in its centre to the end of the towing leg 30 opposite to that fixed to the axle 18 and oriented in a direction parallel to that of the longitudinal axis XX' of the rollers 12a, 12b.

The ends of the jacks 40a, 40b opposite to those bearing on the supporting bar 42 are fixed to a second supporting bar 44 integral with the crossbar 36 and oriented in a direction parallel to the second articulation axis HH'.

A shock absorber 46 is placed between the free end of the crossbar 36 and the frame 10.

FIGS. 1 to 3 correspond to a machine configuration more particularly usable for sowing seed on land having few irregularities and which is generally the case when the land has been correctly prepared for receiving seed. In this configuration the jacks 40a and 40b are locked and have the same elongation.

However, this configuration is not generally suitable for road transportation because it does not enable the rollers 12a, 12b to adapt to the irregularities of the road because the axis XX' remains constantly parallel to the axis HH'. In this case, the contact between the tyres and the road having deformations is not regular over the entire length of the rollers and this can consequently lead to irregular or premature tyre wear.

For road transportation purposes it is preferable to release the jacks 40a, 40b. In the manner shown in FIG. 4, where identical elements to those of FIGS. 1 to 3 carry the same references, the release of the jacks 40a, 40b enables the longitudinal axis XX' of the rollers 12a, 12b to assume different inclinations with an angle of plus or minus α relative to the second articulation axis HH' rotating about the first reference axis YY' as a function of road irregularities. In this case the jacks 40a, 40b only have a shock absorbing function identical to that of the shock absorber 46 positioned between the free end of the crossbar 36 and the frame 10.

According to another variant of the invention, it is possible to increase the width of the drills by fixing to the chassis in juxtaposed manner several roller pairs of the type shown in FIGS. 1 to 4.

In the case of FIGS. 5 to 8 showing different configurations for an arrangement comprising two pairs of rollers P1, P2, identical to those of FIGS. 1 to 4, FIG. 5 is a seed drill configuration where the machine moves on relatively flat ground. In this case, the axes XX' of each roller pair are aligned and the machine moves with its jacks locked. The variation between two pairs of rollers P1, P2 and between the rollers 16a, 16b of one pair is equal to the spacing X of the circumferential, dome-shaped profiles of the rollers, so as to ensure regular ground working without giving rise to the appearance of a planar continuity space between two adjacent furrows ploughed by two pairs of rollers.

In exemplified manner, the length of each roller can be 0.70 meter with a spacing X of the dome-shaped, circumferential profiles of the rollers between e.g. 100 and 200 mm. For a spacing of 125 mm, this corresponds in an embodiment having two pairs of rollers to a total roller length of approximately 3 metres.

FIGS. 6 to 8 correspond to road transport configurations of the machine with two pairs of rollers P1, P2 of FIG. 5. In this case the machine moves with the jacks 40a, 40b of each pair of rollers unlocked enabling each pair of rollers to adapt to the road profile.

FIGS. 6 and 7 show that on a cambered road with a convex or concave profile the two pairs of rollers adapt to the road profile on moving away from one another, each pivoting about their roll axis in opposite rotation directions.

FIG. 8 corresponds to a deformed road configuration, where the machine runs on two tracks raised on one side and extending over different parallel planes, each track being taken by a single pair of rollers. It can be seen that the two pairs of rollers adapt to the road profile by rotating respectively by the same angle about their roll axis YY' and inclining differently about the second articulation axis HH'.

It is clear that the adaptation of the pneumatic tyres to the road profile can be improved by decreasing the length of the rollers and increasing their number. However, as a result of the road clearance diagram, said number cannot be increased beyond a limit imposed by said clearance, except when certain arrangements are made of the type illustrated in FIG. 9, which provides for the upward folding of the pairs of rollers located at the two ends of the roller pair assembly and this takes place about a hinge fixed to the frame 10 enabling the machine to return within said clearance diagram. This naturally has the advantage of making it possible to increase the width of the land sown for each passage of the machine. It is optionally possible to consider increasing said width by further increasing the number of folded up roller pairs.

What is claimed is:

1. Agricultural machine comprising a support frame and several rollers connected to said support frame, each roller being equipped with a set of pneumatic tyres engaging round a tube and having respective dome-shaped, circumferential profiles able to form a set of furrows in the ground, and having a number of roller pairs respectively connected to the machine frame by a linking part, the linking part of each roller pair being adapted to enable the rollers to incline freely about a first roll axis perpendicular to and coplanar with the longitudinal axis of the rollers and about a second axis parallel to the pitch axis of the frame, no matter what road or terrain deformations are encountered, and wherein each tube of a roller pair is mounted on a hub at the end of an axle, said axle having a longitudinal axis coinciding with the longitudinal axis of the rollers.

2. Agricultural machine according to claim 1, wherein said axle of each roller pair is made integral with the support frame by a towing leg fixed by one of its ends to the centre of the axle and engaged by its other end in a thrust bearing fitted to the linking part.

3. Agricultural machine according to claim 2, wherein said linking part is shaped like a gallows, comprising an upright and a crossbar arranged at right angles and is articulated level with the intersection of the upright and the crossbar about an articulation axis parallel to the pitch axis of the frame, the towing leg being articulated by its end engaged in the thrust bearing of the linking part about the roll axis perpendicular to the longitudinal axis of the rollers.

4. Agricultural machine according to claim 3, wherein said thrust bearing is fixed to the upright of the linking part at its end opposite to that common with the crossbar.

5. Agricultural machine according to claim 3, wherein said towing leg is rotated about the first roll axis by two jacks arranged symmetrically and respectively bearing at the ends of a support bar fixed in its centre at the end opposite to that which is fixed to the axle and oriented in a direction parallel to that of the longitudinal axis of the rollers and in that the ends of the jacks opposite to those bearing on the support bar are fixed to a second support bar integral with the crossbar and oriented in a direction parallel to the second articulation axis.

6. Agricultural machine according to claim 3, including a shock absorber placed between the free end of the crossbar and the frame.

7. Agricultural machine according to claim 1, wherein said hubs are provided with drum brakes or disk brakes.

8. Agricultural machine according to claim 1, wherein said pneumatic tyres are held between two end flanges ensuring the holding and securing of the set of tyres.

9. Agricultural machine according to claim 8, wherein said flanges are removable so as to be able to fit or replace the tyres.

10. Agricultural machine according to claim 1, including a transverse disk fixed perpendicular to the inner wall of each of the tubes in order to ensure the fixing of each tube to respectively the two hubs fitted at the ends of the axle.

11. Agricultural machine according to claim 10, wherein radial brackets are positioned on either side of each of the disks and are fixed between the surfaces of each of the disks and the inner wall of each tube.

12. Agricultural machine according to claim 1, where in said roller pairs located at the two ends of the roller pair assembly are folded back about a hinge fixed to the frame during road transport of the machine.

* * * * *